United States Patent [19]

De Matteo et al.

[11] 4,295,372

[45] Oct. 20, 1981

[54] GRAVITY MEASUREMENT APPARATUS FOR SHIPS

[75] Inventors: John De Matteo, Whitestone; Frank Villani, Brooklyn, both of N.Y.

[73] Assignee: The United States of America as represented by the Secretary of the Navy, Washington, D.C.

[21] Appl. No.: 781,488

[22] Filed: Dec. 5, 1968

[51] Int. Cl.² .............................................. G01M 1/12
[52] U.S. Cl. .................................. 73/382 G; 73/178 R
[58] Field of Search .................................... 73/382, 178

[56] References Cited

U.S. PATENT DOCUMENTS 3,242,736  3/1966  Winter et al. ........................ 73/282

Primary Examiner—Richard D. Lovering

Attorney, Agent, or Firm—Richard S. Sciascia; Arthur A. McGill; Prithvi C. Lall

[57] ABSTRACT

The output of the vertical accelerometer of a ships inertial navigation system (SINS), in pulse form, is first counted and scaled to provide an output related directly to the total acceleration. The SINS computer provides the latitude, and north and east velocities of the ship, which are then converted into the theoretical gravity and the Coriolis error. These two factors are subtracted from the total scaled acceleration, and the resultant output is passed through a filter that corresponds to a particular weighting function (heavily weighted for the middle time) to remove the factor of ships heave acceleration. The final output is the free-air gravity anomaly in terms of real time.

4 Claims, 2 Drawing Figures

GRAVITY MEASUREMENT APPARATUS FOR SHIPS

The invention described herein may be manufactured and used by or for the Government of the United States of America for governmental purposes without the payment of any royalties thereon or therefor.

BACKGROUND OF THE INVENTION

The present invention relates to the measurement of the force of gravity and more particularly pertains to an apparatus for the continuous measurement of gravity over the surfaces of the oceans as a ship moves over these regions.

In the field of gravity anomaly measurement, it has been the general practise to employ specifically designed equipment such as the LaCoste-Romberg gravity meter. Such equipment is both expensive and delicate, requiring special handling in addition to highly skilled operators. The present invention obviates these deficiencies in that it incorporates various navigational apparatus presently aboard vessels.

SUMMARY OF THE INVENTION

This invention provides a device for measuring gravity anomaly in ocean regions. The output of a vertical accelerometer is applied to a vertical velocity routine and to a counting-scaling means. The output of the counter is applied to a correction means that cancels out the theoretical gravity and the vertical component of the Coriolis error which values are supplied by the vertical velocity routine of the Mardan computer, which is described in the publication "Mardan Computer and Test Set for SINS MK 2 MODS 2 and 3", NAVSHIPS 324-0549, Volume 2-Description, Operation and Maintenance, published by direction of the Director, Special Projects Office, Department of the Navy. (The Mardan computer is used as the computational element of the SINS MK 2 MODS 2 and 3; the Mardan Maintenance Test Set is used to check the functional operation of the Mardan computer.). The resultant output consists of the gravity anomaly and the ships heave. By filtering out the ships heave, the final output is the free-air gravity anomaly.

An object of the present invention is to provide a means for measuring the gravity anomaly aboard a moving ship for employing, in the main, existing navigational equipment.

Another object is to provide an apparatus which is relatively inexpensive, simple, accurate and continuously operative to determine and measure gravity anomaly while the ship is in motion.

Other objects and many of the attendant advantages of this invention will be readily appreciated as the same becomes better understood by reference to the following detailed description when considered in connection with the accompanying drawings wherein:

FIG. 1 is a schematic diagram, partly in block form, of an embodiment made in accordance with the principles of the present invention, and FIG. 2 is a perspective view of a standard velocity meter.

DESCRIPTION OF THE PREFERRED EMBODIMENT

Figure 1:
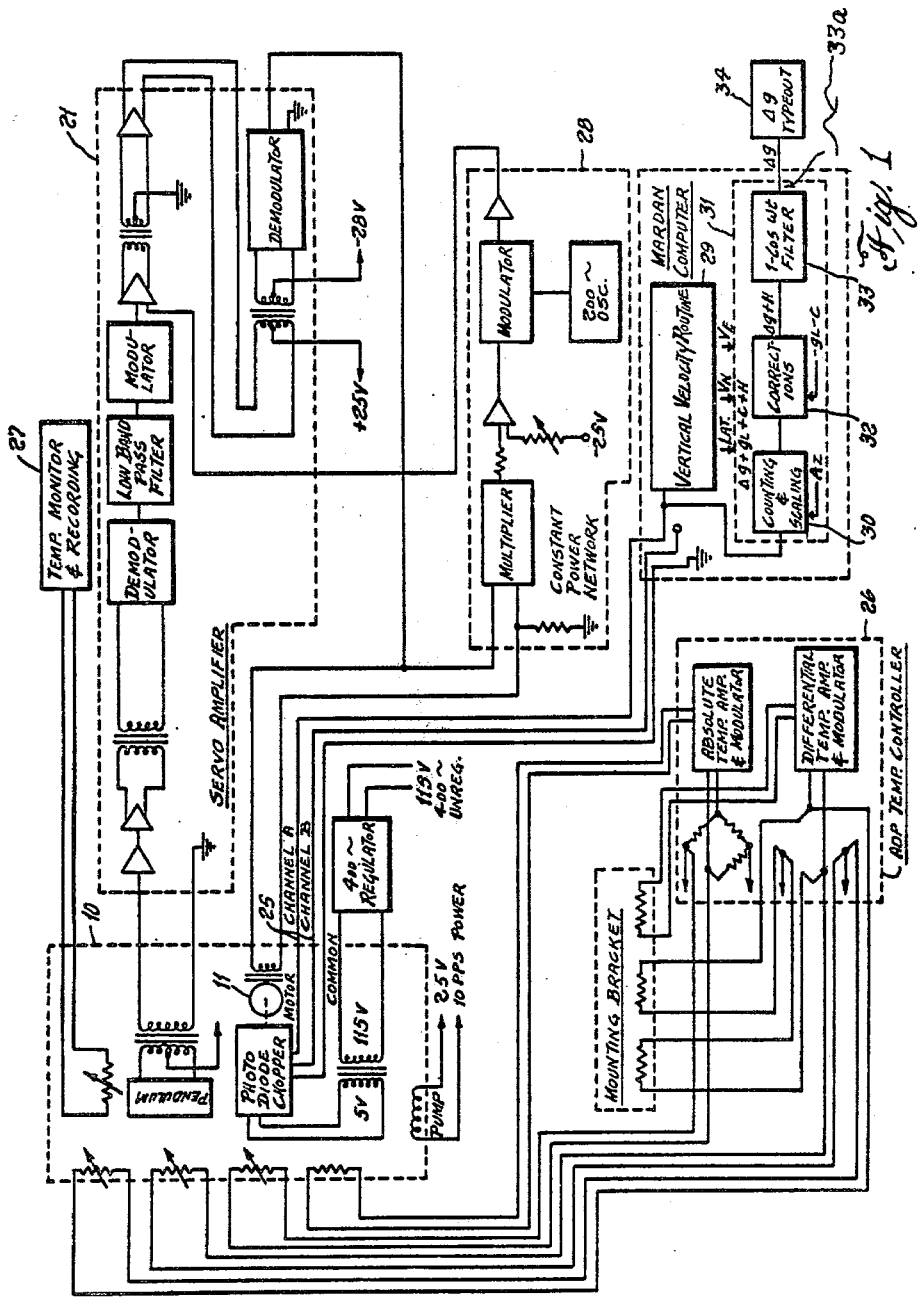
Figure 2:
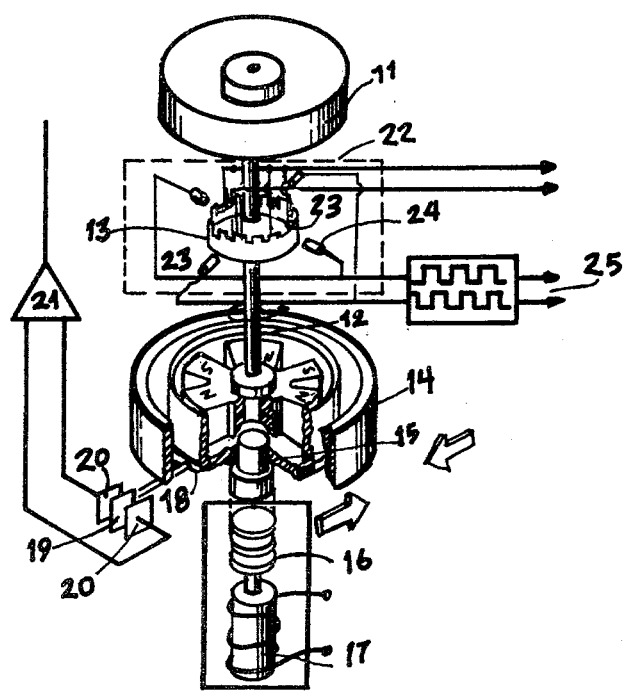

In the illustrated embodiment of FIG. 1, the vertical accelerometer of velocity meter 10 is mounted aboard a ship with its input axis normal to the Ships Inertial Navigation System (SINS) platform leveling accelerometers so that it is sensitive to, and measures in total gravity, which includes ship vertical heave and the vertical component of Coriolis error resulting from the ships travel. These accelerometers are commercially available and one such unit found satisfactory is designated as VM7G, Autonetics Velocity Meter, which is basically illustrated by way of FIG. 2. The meter basic components include a hysteresis drive motor 11 carried by a rotatable magnetic shaft 12, which in turn supports for rotation therewith a notched shutter 13. At the lower end thereof is a magnetic coupling assembly 14 which is supported by a fluid bearing 15 via a diaphragm 16 and a fluid pump 17. The magnetic assembly is coupled to a pendulum assembly 18 (shown in part) which carries a capacitor plate 19 disposed intermediate a pair of fixed plates 20. The outer fixed plates are electrically connected to a servo control amplifier 21 whose output is applied to drive motor 11, thus providing a compensating feedback loop.

A displacement of the pendulum assembly 18 will alter the capacitance between the fixed plates 20 and thereby cause a restoring signal to the motor 11. This restores the pendulum assembly to its null or rest position. The velocity meter output is obtained from a photoelectric commutator readout encoder 22 which includes the shutter 13, lamps 23 mounted within the shutter and directed toward photodiodes 24 so that as the magnetic shaft 12 rotates the diodes will provide a digital output as at 25.

Referring now to FIG. 1, the velocity meter 10 is provided with various monitoring, recording and temperature controlling systems 26 and 27 which serve to regulate the environmental conditions under which the meter functions. The pendulum output is applied to a servo amplifier system 21 which processes the output, finally demodulates and applies its output to the motor 11 which is also connected to constant power network 28.

The digital or chopped output of the photodiodes is applied simultaneously to the vertical velocity routine 29 of the SINS Mardan Computer and to a counter and scaler 30 which provides a scaled count output proportional to vertical accelerations sensed by the pendulum. The counter and scaler 30 form a part of gravity information processing unit 31 which is connected to the routine 29 of the computer which continually supplies the ships north and east velocities and its latitude and converts these into the theoretical gravity, $g_L$, and the Coriolis error, C. These factors are fed into a correction or summing network 32 in negative form as is the scaled count from scaler 30. The output after correction or removal of the theoretical gravity and the Coriolis error leaves only the free-air gravity anomaly $\Delta g$ and the ships heave acceleration H which are applied to filter 33.

This filter 33 is effectively a weighted averaging function. It should be borne in mind that the ships heave is a cyclic phenomenon and for any number of integral cycles the vertical acceleration is zero. Since it is impossible to select a sampling period with an integral number of cycles, the average vertical acceleration of the ships heave will not be zero. By employing a filter having a weighting function which is negligible at the beginning and end of the sampling period, the average vertical acceleration term will be, for practical purposes, zero. In other words, the ships heave component will be totally cancelled. This time average filter can be functionally represented by (1-cos wt) and is graphically illustrated at 33a. The resulting output from this filter is therefore the free-air gravity anomaly and is applied to a read out means 34.

Summarizing the overall operation, the velocity meter senses instantaneous accelerations along its vertical input axis. As the ship navigates through changing gravity fields, the vertical accelerations consisting of the sum $g_L$ (theoretical gravity), C (Coriolis error), H (ships heave acceleration) and $\Delta g$ (free-air gravity anomaly) cause the pendulum center of mass to be displaced from its rest or null position. The displacement is detected by the pickoff sensor. The pick-off angle is determined and the appropriate D.C. current sent through the servo control to the velocity motor, rotating the magnetics the proper amount to move the pendulum back to its null position. The photoelectric system associated with the magnetic shaft generates two-phase pulses at a rate proportional to the angular acceleration. The pulses represent the total gravity figure and they are processed so that they are counted and scaled, applied to a portion of the Mardan computer to remove the $g_L$ and the C factors and subsequently weighted through a time averging filter (1-cos wt) to eliminate the ship's heave. The result is an output indicative of the free-air gravity anomaly. It should be understood, of course, that the foregoing disclosure relates to only a preferred embodiment of the invention and that numerous modifications or alterations may be made therein without departing from the spirit and the scope of the invention as set forth in the appended claims.

We claim:

1. An apparatus for continually measuring the free-air gravity anomaly from a moving vehicle which comprises:

vertical acceleration measuring means carried by said vehicle and having a digital rate pulse output proportional to the instantaneous total vertical acceleration sensed by said measuring means, a scaler/counter having an input and output terminal and providing an output which is scaled to a selected factor and which output is a count of the input pulses, first electrical means connecting the output of said measuring means to the said input terminal of said scaler/counter means, a correction circuit having a pair of inputs and an output, one of its inputs connected to receive the output of said scaler/counter means, the output of said correction being the sum of the input signals, a Mardan navigational computer including a vertical velocity routine for providing an output which is the negative of the theoretical gravity and the Coriolis error, second electrical means connecting the output of said computer to said other input of said correction circuit, a time averaging means having negligible weighting at the beginning and end of the period relative to the center time, said averaging means connected to receive the output of said correction means, and readout means connected to the output of said averaging means, thereby providing an indication of the free-air gravity anomaly.

2. The apparatus according to claim 1 wherein said acceleration measuring means is a velocity meter having its sensitive element mounted for sensing vertical displacement.

3. The apparatus according to claim 2 wherein said time averaging means is a weighted filter.

4. The apparatus according to claim 3 wherein said filter provides a (1-cos wt) function.

* * * * *